United States Patent [19]

Johnson

[11] Patent Number: 4,763,705

[45] Date of Patent: Aug. 16, 1988

[54] TREE FELLING APPARATUS

[75] Inventor: Calvin S. Johnson, Union Grove, N.C.

[73] Assignee: CTR Manufacturing, Inc., Union Grove, N.C.

[21] Appl. No.: 38,331

[22] Filed: Apr. 14, 1987

[51] Int. Cl.$^4$ ............................................. A01G 23/08
[52] U.S. Cl. .................................. 144/34 R; 144/336
[58] Field of Search .................... 144/3 D, 2 Z, 34 R, 144/355, 336; 83/938; 30/379.5

[56] References Cited

U.S. PATENT DOCUMENTS

| 3,672,412 | 6/1972 | Albright | 144/34 A |
| 3,848,648 | 11/1974 | Dika et al. | 144/34 R |
| 4,462,439 | 7/1984 | Dagenais | 144/34 R |

Primary Examiner—W. Donald Bray
Attorney, Agent, or Firm—Shefte, Pinckney & Sawyer

[57] ABSTRACT

Tree felling apparatus having a U-shaped base with laterally spaced hollow arms defining a cutting area for receiving therein a tree to be cut and having a chain saw mechanism pivotably mounted to the base centrally between the arms for pivotal cutting movement into and out of the cutting area through the hollow area in one arm of the base. The chain saw mechanism is dimensioned to occupy substantially the full cutting area at the completion of its cutting stroke, and has a distal transverse support flange adapted to be supported at its opposite ends within the hollow areas of each arm at the completion of the cutting stroke to assist the pivotal sw mounting in supporting and stabilizing the chain saw mechanism against damage by the tree. A rotational bearing assembly pivotably supports the chain saw mechanism on the base enabling location of the chain drive motor coaxially with the pivot location of the chain saw mechanism for fixed stationary mounting of the motor relative to the base, while also leaving the underside of the chain saw mechanism unattached to the base and readily accessible for chain replacement in endless form without any required disassembly of any apparatus components.

22 Claims, 4 Drawing Sheets

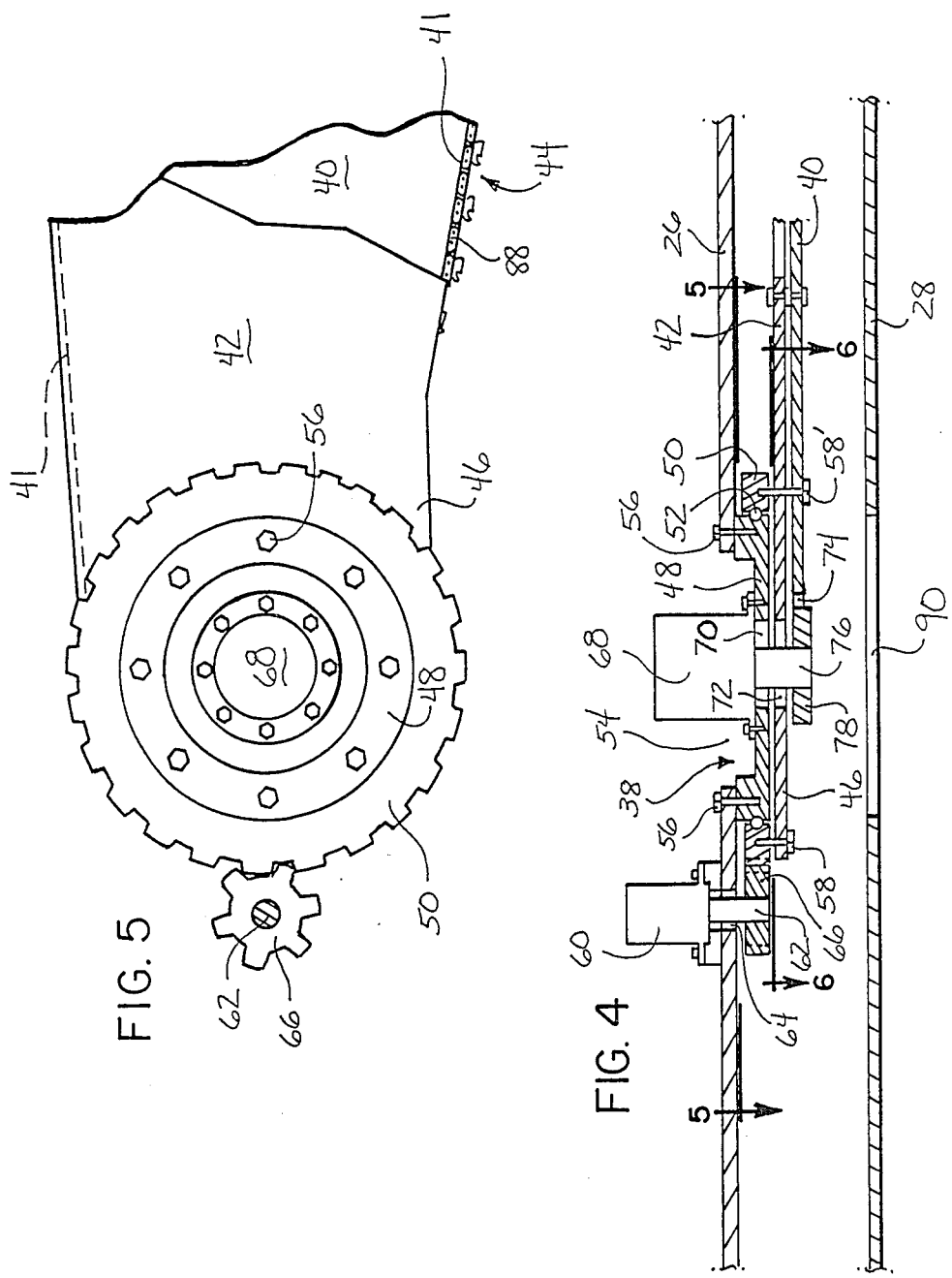

TREE FELLING APPARATUS

BACKGROUND OF THE INVENTION

The present invention relates generally to the tree harvesting art and, more particularly, to an improved apparatus for felling trees.

For centuries, trees have been commercially harvested on a mass scale for processing of their wood into all forms of timber, lumber, paper and other derivative products. Historically, the initial operation of felling trees at the harvesting site has been carried out manually and, even today, many tree felling operations are performed utilizing only a manually operated hand-held chain saw mechanism. Over recent years, various forms of automated tree felling apparatus have been developed, typically being adapted for mounting to a conventional off-road commerical vehicle such as a so-called front end loader for ready transportation and operation at a harvesting site. Representative examples of such tree felling apparatus and similar tree harvesting equipment are disclosed in U.S. Pat. Nos. 3,565,138; 3,612,115; 3,613,923; 3,672,412; 3,796,242; 3,874,432; 3,881,615; 3,905,104; 3,946,775; 3,991,799; 4,013,106; 4,050,488; 4,053,005; 4,161,200; 4,219,058; and 4,219,059.

Conventional tree felling apparatus of this type have been relatively slow to gain widespread acceptance within the tree harvesting industry for a variety of reasons. Substantially all known commercially produced felling apparatus are adapted for use only with relatively small diameter trees of no more than 24 inches in diameter and 40 to 50 feet in height, which of course significantly limits the range of harvesting operations with which such apparatus may be effectively used. Further, some felling apparatus utilize relatively large, hydraulically operated, scissor-like cutting blades which, in addition to being limited in use to relatively small trees, normally cause substantial fiber damage to trees felled therewith for several feet of each tree's length above the cutting location, thus making such apparatus entirely unsuitable for harvesting trees to be utilized for the production of furniture and other high grade lumber materials. While other felling apparatus utilize a cutting mechanism of the chain saw type to avoid this problem, the necessary requirement of periodically replacing the cutting chain due to its dulling over use or occasional breakage thereof is disadvantageously a difficult and time consuming operation typically requiring the entire removal or other substantial disassembly of the chain saw mechanism from the felling apparatus for installation of a new cutting chain in endless form or, alternatively, requiring the installation of a non-continuous length of cutting chain and the riveting together of its opposite ends.

In contrast, the present invention provides an improved tree felling apparatus which is suitably stable and effective for felling larger trees of up to 36 inches in diameter and 80 to 100 feet in height and utilizes a uniquely designed arrangement for mounting and driving the chain saw mechanism which permits the simple and ready replacement of a worn or broken cutting chain in endless form without any required disassembly of the felling apparatus. Other features and advantages of the present invention will appear from the disclosure hereinafter.

SUMMARY OF THE INVENTION

Briefly summarized, the present tree felling apparatus basically includes a base adapted for disposition in generally stationary relation to a trunk portion of a tree to be felled and a saw mechanism pivotably mounted to the base for tree cutting movement with respect thereto. Preferably, the saw mechanism is of the chain saw type utilizing a saw bar and a saw chain mounted to the bar for cutting movement along its peripheral extent.

According to one feature of the present invention, the base is of a generally U-shaped having a pair of laterally spaced arm portions which define therebetween an open cutting area for receiving a trunk portion of a tree to be felled. The saw mechanism is pivotably mounted to the base generally intermediate the arm portions for tree cutting movement through the cutting area transversely with respect to the arm portions. The saw mechanism includes a distal support portion radially outwardly from the pivot mounting location of the saw mechanism, the distal portion being of a greater transverse dimension extending substantially a parallel to the direction of the transverse tree cutting movement of the saw mechanism than the corresponding transverse dimension between the arm portions. A support arrangement is provided on each arm portion of the base for supporting transversely opposite sides of the distal support portion of the saw mechanism upon its cutting movement to occupy the full transverse extent of the cutting area between the arm portions in order to stabilize the saw mechanism against reactive forces exerted by a tree being cut.

In the preferred embodiment, one of the arm portions of the base has a hollow interior area for reciprocal pivotal movement therethrough of the saw mechanism into and out of the cutting area, while the other arm portion also has a hollow interior area for receiving the leading side of the distal support portion when it occupies the full transverse extent of the cutting area. Each arm portion includes a pair of spaced support members defining therebetween their respective hollow interior areas, the distal support portion of the saw mechanism including an engagement member extending the transverse extent thereof to be contained between the support members of each arm portion. Preferably, the engagement member of the saw mechanism is mounted to the saw bar at its distal outward end from the pivot mounting location of the saw bar. The base also includes a fulcrum member mounted on its other arm portion at a spacing elevated from the path of cutting movement of the saw mechanism to provide a pivot surface about which may fall the trunk portion of a tree cut by the saw mechanism in order to direct the cut area of the trunk portion away from the saw mechanism to prevent damage thereto as the tree falls. The base further includes a pusher assembly mounted on the base for exerting a pushing force in the direction of the fulcrum member on the trunk portion of a tree being cut, the pusher assembly including a projection member for engaging an adjacent side of the tree to prevent its falling in the direction of the pivot mounting location of the saw mechanism. A toothed portion is additionally provided on the base for penetratingly engaging the trunk portion of a tree being cut to retain the base substantially stationary with respect to the trunk portion.

According to another feature of the present invention, the saw mechanism is pivotably mounted to the base by a mounting arrangement including a mounting member rigidly fixed to the base, a saw drive member rigidly fixed to the saw mechanism and a bearing arrangement supporting the saw drive member on the mounting member for rotational movement with respect thereto. A saw driving mechanism is rigidly fixed to the base in driving relation to the saw drive member for actuating reciprocal rotation of the saw drive member to produce pivotal cutting movement of the saw mechanism relative to the base. According to a further feature of the present invention, a chain drive arrangement is mounted stationarily with respect to the base and has a chain drive member coaxial with the pivot axis of the saw mechanism and in generally coplanar relation with the saw bar in driving engagement with the saw chain. The saw mechanism and the chain drive arrangement are unattached to the base at one side of the saw bar to permit mounting and demounting of the saw chain in endless form to and from the saw bar from such side of the saw bar without any required disassembly of the saw mechanism or its mounting arrangement.

In the preferred embodiment, the saw drive member is of an annular peripherally toothed configuration supported by the bearing arrangement annularly about the periphery of the mounting member in generally coplanar relation therewith, the saw driving arrangement including a compatibly toothed sprocket in peripheral meshing engagement with the saw drive member. The saw drive member is fixed to the saw mechanism at a first side of the saw bar. The mounting member and the saw bar have aligned openings coaxial with the pivot axis of the saw mechanism. The chain drive arrangement is mounted stationarily to the mounting member at the first side of the saw bar and includes a drive shaft extending concentrically through the aligned openings with a drive sprocket affixed to the extending end of the drive shaft in generally coplanar relation with the saw bar in driving engagement with the saw chain. The chain drive arrangement and the saw mechanism are unattached to the base at the opposite side of the saw bar to permit mounting and demounting of the saw chain as aforementioned.

BRIEF DESCRIPTION OF THE DRAWINGS

FIG. 4 is a vertical cross-sectional view of the tree felling apparatus of FIG. 1 taken along line 2—2 of FIG. 2;

FIG. 5 is a horizontal cross-sectional view of the tree felling apparatus of FIG. 1 taken along 5—5 of FIG. 4.

DESCRIPTION OF THE PREFERRED EMBODIMENT

Figure 1:
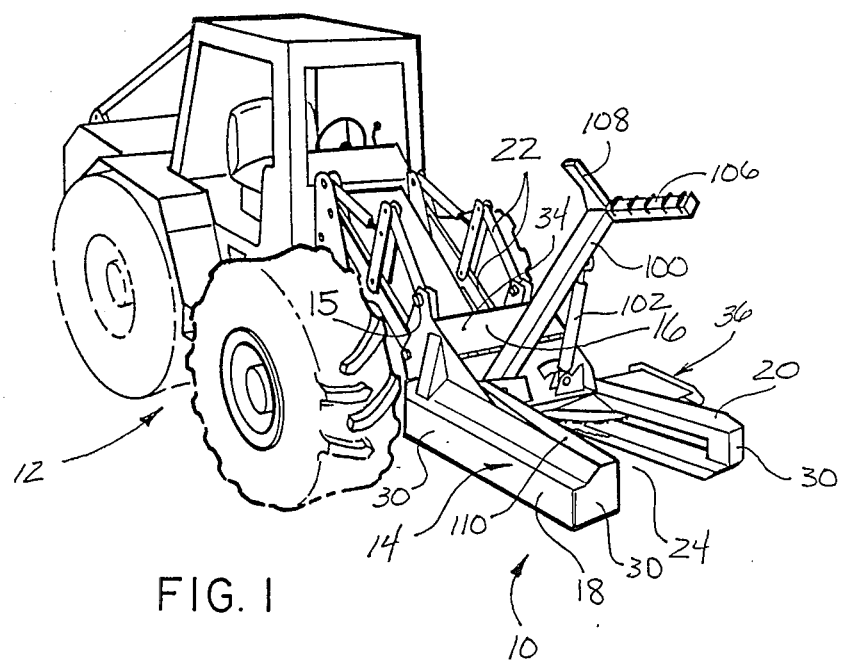
FIG. 1 is a perspective view of the tree felling apparatus of the present invention as preferably embodied in combination with an off-road vehicle of the front end loader type.

Referring now to the accompanying drawings and initially to FIG. 1, the tree felling apparatus of the present invention is indicated generally at 10 in its preferred embodiment front-mounted to a conventional commercial duty off-road vehicle such as a so-called front end loader, indicated generally at 12, which, as is well known, is provided an auxiliary hydraulic power supply system with multiple hydraulic power take-offs for operating accessory and auxiliary equipment. Of course, as those persons skilled in the art will readily recognize, the present tree felling apparatus 10 is equally well adapted for mounting in association with any other suitable vehicle or power train. Inasmuch as the construction and operation of the front end loader 12 and other similar conventional vehicles and power trains are well known, these matters need not be disclosed herein.

The tree felling apparatus 10 of the present invention includes a substantially U-shaped base structure, indicated generally at 14, having a main body structure 16 from which a pair of laterally spaced arm portions 18,20 project outwardly in substantially parallel relation to define an open cutting area 24 therebetween. The base structure 14 is pivotably mounted in a generally horizontal disposition by the main body structure 16 in any suitable conventional manner as at 15 to the forwardly projecting forks 22 of the front end loader 12 to facilitate manipulation of the tree felling apparatus 10 by the forks 22 forwardly, rearwardly, vertically and angularly with respect to the main chassis of the front end loader 12 in conventional fashion. In this manner, the base structure 14 may be maneuvered by the front end loader 12 in field cutting operations to position the base structure 14 at the base of the trunk portion of substantially any tree to be felled so as to receive the trunk portion within the open cutting area 24 defined by the base structure 14.

The base structure 14 is preferably fabricated of structural steel plate and beam members welded together to provide satisfactory structural strength, rigidity and stability to withstand rigorous use under typically extreme in-field working conditions. The lowermost region of the base structure 14 is fabricated of vertically spaced upper and lower structural steel plate members 26,28 of essentially corresponding U-shapes affixed horizontally in substantially parallel superposed relation to one another by welding with a plurality of upright structural steel plate and beam members collectively indicated generally at 30 which extend vertically between the structural members 26,28 along the rearward and side peripheral extent of the main body structure 16, along the laterally outward and forwardly facing peripheral extent of the arm portion 18 and at only the forwardmost portion of the arm portion 20. In this manner, the lowermost region of the body structure 16 and each arm portion 18,20 are respectively hollow and open laterally inward to the cutting area 24 defined by the base structure 14, with the arm portion 20 being additionally open laterally outward to the outside of the base structure 14. A substantially upright hollow housing 32 also fabricated of suitable structural steel plate members is welded to and extends upwardly from the upper structural member 26 across the rearwardmost region of the main body structure 16 for enclosing hydraulic hoses and other control and operating components of the tree felling apparatus 10 as more fully explained thereinafter, the housing 32 including an upwardly facing hinged door 34 to permit access to the housing interior.

Figure 6:
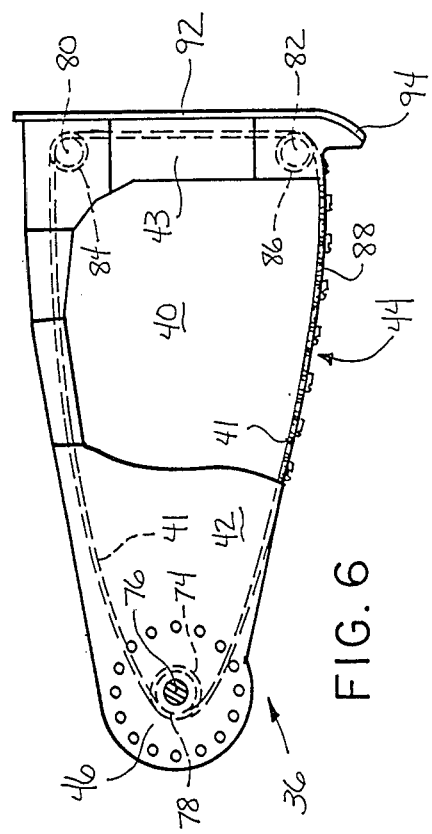
FIG. 6 is a horizontal cross-sectional view of the tree felling apparatus of FIG. 1 taken along line 6—6 of FIG. 4.

A chain saw mechanism, indicated generally at 36, is pivotably supported on the underside of the upper structural member 26 of the base structure 14 generally centrally within the hollow lowermost region of the body structure 16 intermediate the arm portions 18,20 by a mounting mechanism, indicated generally at 38 (FIGS. 2 and 4), for reciprocating pivotal cutting movement of the chain saw mechanism 36 about a substantially vertical axis in a substantially horizontal path extending through the hollow area of the arm portion 20 into and out of the cutting area 24. The particular construction of the chain saw mechanism 36 is best seen in FIG. 6. Basically, the chain saw mechanism 36 includes an elongated planar saw bar or plate 40 with guard plates 42,43 affixed in slightly spaced parallel relation to the upper surface of the saw bar 40 along substantially its entire periphery except along a forward leading cutting extent indicated at 44. As desired for additional safety, similar guard plates (not shown) may be affixed to the lower surface of the saw bar 40 as well. The peripheral edges 41 of the saw bar 40 are formed with a continuous recessed groove to accept a conventional saw chain 46 as hereinafter described.

The upper guard plate 42 includes a mounting portion 46 which extends substantially beyond the radially inward end of the saw bar 40 to facilitate pivotal mounting of the chain saw mechanism 36 by the mounting arrangement 38, as will best be understood with reference to FIGS. 4–6. The mounting arrangement 38 is a rotational bearing assembly of the type sometimes commonly referred to as a "slewing ring" which basically includes a central circular mounting plate 48 and an annular, peripherally toothed, circular drive gear 50 annularly supported about the periphery of the mounting plate 48 in generally coplanar relation therewith by a ball bearing arrangement 52 disposed annularly intermediate the facing peripheries of the mounting plate and drive gear 48,50. The upper structural steel plate member 26 of the base structure 14 is formed with a circular opening 54 centrally of the body structure 16 coaxial with the desired pivot location of the chain saw mechanism 36 and the mounting plate 48 is affixed to the underside of the structural member 26 concentrically with the opening 54 by a plurality of bolts 56 extending through the structural member 26 at circumferential spacings about the opening 54 into threaded mounting engagement with the mounting plate 48 at corresponding circumferential spacings concentrically therabout. In turn, the radially inward end of the chain saw mechanism 36 is bolted similarly to the underside of the annular drive gear 50 by a plurality of bolts 58 extending in a circular arrangement through the mounting plate 48 (with some bolts 58' also extending through the saw bar 40) into threaded mounting engagement circumferentially about the annular drive gear 50. As will be understood, the chain saw mechanism 36 is adapted in this manner for pivotal reciprocating movement with respect to the base structure 14 integrally with the drive gear 50 rotationally about the mounting plate 48 which is fixed to the upper structural member 26 of the base structure 14.

To actuate and control the pivotal reciprocating movement of the chain saw mechanism 36, a hydraulically operated motor 60 is fixedly mounted to the upper surface of the upper structural plate member 26 within the housing 32 at a location radially adjacent the mounting opening 54, with a drive shaft 62 of the motor 60 extending downwardly through an opening 64 in the upper plate member 26 and having a toothed sprocket gear 66 fixed to the depending end of the shaft 62 in compatible, peripherally meshed driving engagement with the toothed periphery of the drive gear 50. The hydraulic motor 60 is suitably connected through hydraulic hoses (not shown) with the auxiliary hydraulic drive system of the front end loader in a conventional manner to permit operator control of the motor 60 and the attendant pivotal movement of the chain saw mechanism 36 from the operator compartment of the front end loader 12. In this manner, the chain saw mechanism 36 is arranged for controlled pivotal movement between a withdrawn inactive position substantially fully retracted from the cutting area 24, as shown in full lines in FIG. 2, and an active cutting position pivoted fully across the cutting area 24 to generally fully occupy the area 24 at the completion of a cutting stroke, as shown in broken lines in FIG. 2.

As also seen in FIGS. 4–6, in order to similarly provide driving operation and control for the saw chain of the chain saw mechanism 36, another hydraulic motor 68 is fixedly mounted stationarily to the upwardly facing surface of the stationary mounting plate 48 coaxial therewith and in covering relation to a central axial opening 70 therein. A circular opening 72 is formed in the mounting portion 46 of the upper guard plate 42 of the chain saw mechanism 36 in coaxial alignment with the opening 70 and, similarly, a corresponding coaxially aligned arcuate recessed area 74 is formed in the peripheral edge 41 of the saw bar 40 at its corresponding radially inward end. A drive shaft 76 of the motor 68 extends downwardly coaxially through the aligned openings 70,72 with its terminal end being located coaxially within the recessed area 74 of the saw bar 40 and a chain drive sprocket 78 is affixed to the depending end of the drive shaft 76 within the recessed area 74 coplanarly with the saw bar 40. In similar manner, a pair of idler chain sprocket gears 80,82 are rotatably supported in depending fashion from the underside of the upper guard plate 43 within similar arcuate recessed areas 84,86 in the peripheral edge 41 of the saw bar 40 in coplanar relation therewith. A cutting chain 88, which may be of any suitable conventional construction of the type having guide pins projecting inwardly and cutting teeth projecting outwardly from the chain body, is trained in endless fashion about the peripheral edge 41 of the saw bar 40 with the inwardly projecting guide and drive pins in meshing driven engagement with the drive and idler sprockets 78,80,82 and in guiding engagement in the peripheral groove of the saw bar 40 along the chain extents between such sprockets 78,80,82. In this manner, operation of the hydraulic motor 68 is effective to actuate cutting movement of the saw chain 88 peripherally about the saw bar 40 and the sprockets 78,80,82, with control of the motor 68 being provided from the operator compartment of the front end loader 12 through suitable hydraulic connections of the motor 68 with the auxiliary hydraulic drive system of the loader 12. Preferably, the motor 68 is operated to rotate its drive shaft 76 and drive sprocket 78 in a counterclockwise direction as viewed in FIGS. 5 and 6 to cause the chain 88 to move in an outward direction along the cutting extent 44 of the saw bar 40 away from the main body structure 16 of the base structure 14 so that during tree cutting operations sawdust, wood chips and the like are expelled outwardly away from the tree felling apparatus 10.

Importantly, according to the present invention, the entire mounting arrangement 38 for the chain saw mechanism 36 is mounted only in depending fashion from the underside of the upper structural steel plate member 26 of the main body structure 16 without any attachment of any of the constituent components to the lower structural steel plate member 28. In this manner, free access to the entire operating extent of the saw chain 88 may be had from the underside of the chain saw mechanism 36 to readily facilitate replacement of the saw chain 88 when necessary as a result of wear or breakage. For this purpose, a relatively large access opening 90 is formed in the lower structural steel plate member 28 immediately below the drive sprocket 78 to permit manual access into the hollow area within the main body structure 16 between the upper and lower members 26,28. Further, one of the chain idler sprockets 80,82 is affixed to the guard plate 43 by a suitable slotted or similar connection (not shown) permitting the sprocket to be adjustably positioned toward and away from the saw bar 40 to selectively loosen and tighten the cutting chain 88 to readily facilitate removal of a worn or broken chain 88 and installation of a new chain 88. As a result, a replacement saw chain 88 already constructed in its desired endless form may be installed from the underside of the chain saw mechanism 36 and through the access opening 90 without any necessary disassembly of any of the mounting and drive components for the chain saw mechanism 36, whereby the inherently necessary periodic replacement of the saw chain 88 may be carried out simply, easily and quickly with a minimal amount of down time of the tree felling apparatus 10.

Figure 2:
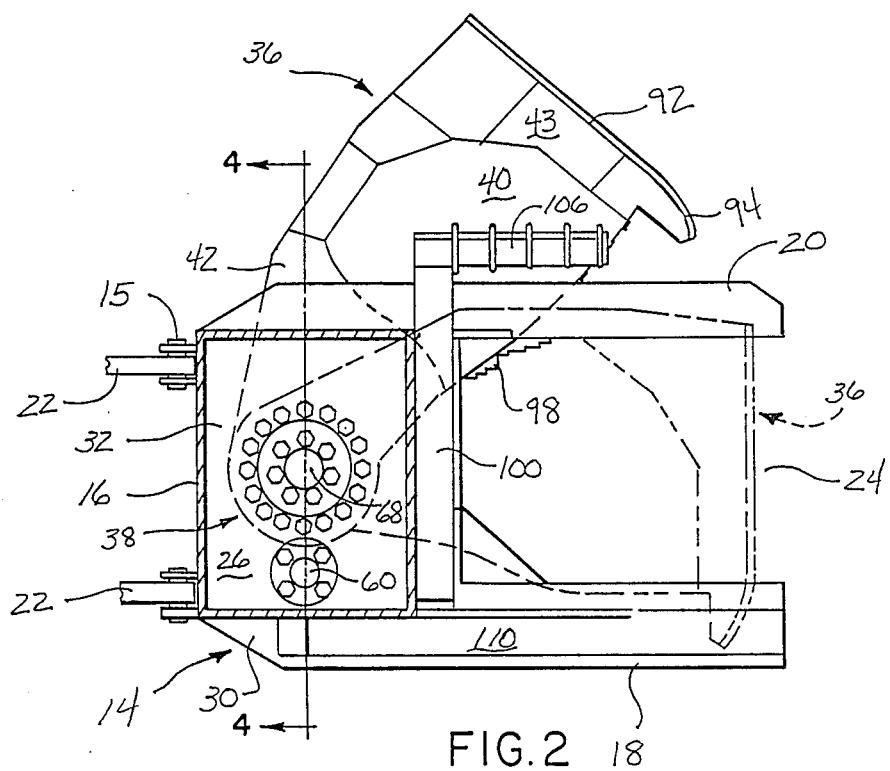
FIG. 2 is a top plan view of the tree felling apparatus of FIG. 1.
Figure 3:
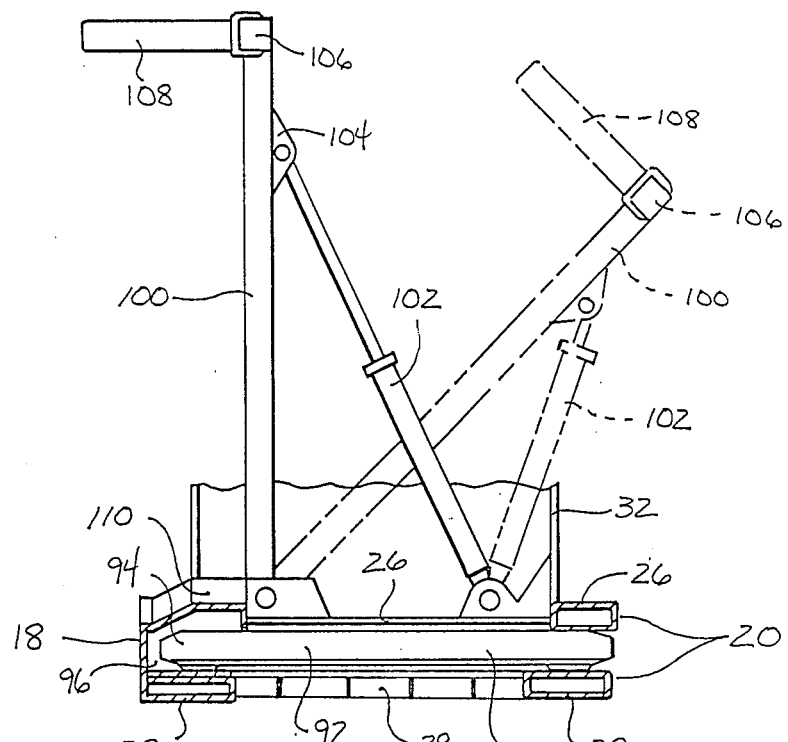
FIG. 3 is a front elevational view of the tree felling apparatus of FIG. 1 with the projecting free ends of the arm portions of the base broken away.

According to another feature of the present invention, the chain saw mechanism 36 and the base structure 14 are cooperatively constructed to provide ample support for the chain saw mechanism 36 throughout its reciprocating pivotal cutting movement into and out of the cutting area 24, as will best be understood with reference now to FIGS. 2 and 3. As will be recognized from the top plan view of the present tree felling apparatus 10 seen in FIG. 2, the arm portions 18,20 of the base structure 14 are relatively widely spaced from one another, preferably on the order of 36 inches or more so as to accommodate relatively large diameter trees. As will also be recognized in FIG. 2, the chain saw mechanism 36 is of an overall lateral dimension in its transverse extent taken substantially parallel to the arcuate direction of its reciprocal pivoting tree cutting movement which dimension is slightly greater than the lateral spacing between the arm portions 18,20 so that the chain saw mechanism 36 substantially fully occupies the entire cutting area 24 between the arm portions 18,20 at the completion of the cutting stroke of the chain saw mechanism 36, as seen in broken lines in FIG. 2 and in full lines in FIG. 3. Further, the radially outwardmost extent of the upper guard plate 43 of the chain saw mechanism 36 has a guide and support flange 92 perpendicularly projecting therefrom upwardly and downwardly beyond the overall thickness of the guard plate 43 and the saw bar 40 along the full radially outward transverse extent of the chain saw mechanism 36 most distal from the pivotal mounting location thereof, with a tapered nose portion 94 of the flange 92 projecting forwardly beyond the leading side of the chain saw mechanism 36. The overall vertical dimension of the flange 92 along its principal longitudinal extent relatively closely corresponds to the vertical dimension of the hollow area within the arm portion 20 defined by the spacing between the upper and lower structural steel plate members 26,28 along the arm portion 20.

Accordingly, the flange 92 is closely confined between the upper and lower structural members 26,28 of the arm portion 20 throughout the full extent of the reciprocating pivotal cutting movement of the chain saw mechanism 36 through the hollow confines of the arm portion 20. Furthermore, the arm portion 18 is formed within its hollow area at its forwardmost end with a confined box-like receiving portion 96 which opens laterally to the cutting area 24 to receive and support the projecting nose portion 94 of the flange 92 at the completion of the inward cutting movement of the chain saw mechanism 36. As will be understood, at the completion of the cutting stroke of the chain saw mechanism 36, it is most vulnerable to potential damage by reactive forces exerted by a tree being cut and, accordingly, at such point in the reciprocal cutting movement of the chain saw mechanism 36, the base structure 14 securely supports the chain saw mechanism at three separate locations, i.e. at the pivot mounting location of the chain saw mechanism 36 within the body structure 16 by the mounting arrangement 38, at the distal radially outwardmost location at the leading side of the chain saw mechanism 36 by engagement of the nose portion 94 in the receiving member 96 within the hollow area of the arm portion 18, and at the distal radially outwardmost location at the trailing side of the chain saw mechanism 36 by confinement of the opposite end of the flange 92 in the forwardmost region of the hollow area within the arm portion 20. In this manner, the chain saw mechanism 36 is substantially stabilized at the completion of its cutting movement against any reactive forces which may be exerted by the tree being cut.

To further assist in stabilizing the base structure 14 against reactive forces exerted by the tree being cut, the lower structural steel plate member 28 is preferably formed with serrations 98 (FIG. 2) or similar teeth-like projections along its edge facing inwardly of the cutting area 24 at the juncture between the main body structure 16 and the arm portion 20 so as to penetratingly engage the trunk portion of the tree being cut in order to retain the overall base structure 14 substantially stationary with respect to the trunk portion.

The base structure 14 of the present tree felling apparatus 10 is also provided with additional features to assist in inducing the desired falling action and direction of a tree being cut. As seen in FIGS. 1-3, an elongated pusher arm assembly 100 is pivotably mounted in generally upright fashion to the forwardmost region of the main body structure 16 immediately adjacent the arm portion 18 about a substantially horizontal axis extending in substantially parallel relation to the arm portions 18,20 for pivotal movement of the pusher bar assembly 100 in an essentially vertical plane toward and away from the arm portion 18. For controlling the actuation of pivotal movement of the pusher arm assembly 100, a hydraulically operated piston-and-cylinder assembly 102 is pivotably mounted by its operating cylinder at the opposite forwardmost region of the main body structure 16 immediately adjacent the arm portion 20 and extends upwardly therefrom to a clevis 104 adjacent the outward end of the pusher arm assembly 100 by which the piston member of the piston-and-cylinder assembly 102 is affixed pivotably to the pusher arm assembly 100. In this manner, the piston-and-cylinder assembly 102 constrains the pusher arm assembly 100 to pivot between an inactive position inclined away from the arm portion 18, as shown in broken lines in FIG. 3, and an active position pivoted beyond verticality to be inclined toward the arm portion 18, as shown in full lines in FIG. 3. As will be understood, actuation and control of the piston-and-cylinder assembly 102 is achieved through suitable hydraulic connections with the auxiliary hydraulic drive system of the front end loader 12 for controlled operation of the pusher bar assembly 100 from the operator compartment thereof. The outward end of the pusher arm assembly 100 has a pusher bar 106 extending perpendicularly from the main upright of the pusher bar assembly 100 in substantially parallel relation to the arm portions 18,20 and also has a thumb portion 108 extending perpendicularly to the main upright of the pusher arm assembly 100 and to the pusher bar 106 in the direction toward the arm portion 18.

In tree cutting operation of the tree felling apparatus 10, the pusher bar assembly 100 is pivoted from its inactive position toward the arm portion 18 to engage the pusher bar 106 with the trunk portion of the tree being cut at the side thereof opposite the arm portion 18 and at a substantial elevation above the cutting action of the chain saw mechanism 36. Hydraulic force is continuously supplied through the piston-and-cylinder assembly 102 to urge the pusher arm assembly 100 for continued pivotal movement toward the arm portion 18 throughout the cutting action of the chain saw mechanism 36 to assist in felling the tree across the arm portion 18 in the direction of pivotal movement of the pusher bar assembly 100. Importantly, the thumb portion 108 serves to prevent the tree from falling rearwardly in the direction of the front end loader 12 to aid in protecting the loader operator against injury. In conjunction with the pusher arm assembly 100, a structural steel bar member 110 is affixed to the upper surface of the arm portion 18 and extends upwardly therefrom to a sufficient elevation above the path of cutting movement of the chain saw mechanism 36 to provide a fulcrum or pivot surface about which the trunk portion of the tree being cut may fall, thereby to cooperate with the pushing action of the pusher bar assembly 100 to direct the cut area of the trunk portion of the tree upwardly away from the chain saw mechanism 36 during the falling motion of the tree to aid in preventing possible damage to the chain saw mechanism 36. Preferably, the fulcrum member 110 is inclined slightly downwardly from its rearwardmost to forwardmost ends to also direct the trunk portion of the tree to fall forwardly away from the tree felling apparatus 10.

The operation of the present tree felling apparatus 10 will thus be understood. Initially, the operator of the front end loader 12 maneuvers the loader 12 while manipulating its forks 22 to position the base structure 14 of the tree felling apparatus 10 to receive the base of the trunk portion of a tree to be felled within the cutting area 24 of the base structure 14. The piston-and-cylinder assembly 102 is operated to pivot the pusher arm assembly 100 into engagement of its pusher bar 106 with the side surface of the tree trunk facing away from the arm portion 18. While continuing the application of hydraulic force to the piston-and-cylinder assembly 102, the hydraulic motors 60,68 are operated to actuate traveling movement of the saw chain 88 about the saw bar 40 and the chain sprockets 78,80,82 and simultaneous pivotal movement of the chain saw mechanism 36 through the hollow area of the arm portion 20 into the cutting area 24. As the cutting stroke of the chain saw mechanism 36 is completed with the chain saw mechanism 36 substantially completely occupying the cutting area 24, the nose portion 94 of the chain saw mechanism 36 engages in the receiving member 96 of the arm portion 18 while the opposite trailing end of the support flange 92 remains confined within the hollow area of the arm portion 20, whereby the chain saw mechanism 36 is supported at its pivotal mounting location as well as at the most distal locations along its leading and trailing sides. At the same time, the tree being cut is felled across the fulcrum member 110 by the continuing pivotal movement of the pusher bar assembly 100.

Advantageously, the unique three-point support arrangement provided by the present tree felling apparatus 10 for its chain saw mechanism 36 enables the base structure 14 of the present apparatus to be constructed with a substantially larger cutting area 24 than conventional tree felling equipment and thereby the present apparatus in its preferred embodiment is constructed to accommodate relatively large diameter trees of up to 36 inches in diameter and 80 to 100 feet in height. The novel mounting arrangement 38 for the chain saw mechanism 36, as aforedescribed, advantageously facilitates the installation of replacement saw chains in endless form without the conventional need for disassembling any of the drive or support components for the chain saw mechanism 36. Further, the mounting arrangement 38 enables the chain drive motor 68 to be mounted in a fixed stationary position with respect to the base structure 14, in contrast to other conventional tree felling equipment wherein the chain motor is fixed to the chain saw mechanism to move pivotably therewith which deleteriously poses a potential risk of damage and premature wearing of the hydraulic or other drive connections to the motor. Finally, the pusher bar assembly 100 in conjunction with the fulcrum member 110 provides substantially greater control of the direction in which a tree cut by the present apparatus is felled than is possible in the use of conventional tree felling apparatus.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. Apparatus for felling trees, comprising generally U-shaped base means having a pair of laterally spaced arm portions defining therebetween an open cutting area for receiving a trunk portion of a tree to be felled and saw means pivotably mounted to said base means generally intermediate said arm portions for tree cutting movement through said cutting area transversely with respect to said arm portions, said saw means having a distal support portion radially outwardly from the pivot mounting location of said saw means, said distal portion extending substantially parallel to the direction of said transverse tree cutting movement of said saw means and being of a greater transverse dimension than the corresponding transverse dimension between said arm portions, said base means having means on each said arm portion for supporting transversely opposite sides of said distal support portion upon cutting movement thereof to occupy the full transverse extent of said cutting area between said arm portions to stabilize said saw means against reactive forces exerted by a tree being cut.

2. Apparatus for felling trees according to claim 1 and characterized further in that one said arm portion has a hollow interior area for reciprocal pivoting movement therethrough of said saw means into and out of said cutting area and the other said arm portion has a hollow interior area for receiving the leading one of said opposite sides of said distal support portion when it occupies the full transverse extent of said cutting area.

3. Apparatus for felling trees according to claim 2 and characterized further in that each said arm portion includes a pair of spaced support members defining therebetween the respective said hollow interior area, said distal support portion of said saw means including an engagement member extending the transverse extent thereof to be contained between said support members of each said arm portion.

4. Apparatus for felling trees according to claim 3 and characterized further in that said saw means comprises chain saw means having a saw bar pivotably mounted to said base means and a saw chain mounted to said saw bar for movement along its peripheral extent, said engagement member being mounted to said saw bar at its distal outward end from the pivot mounting location of said saw bar.

5. Apparatus for felling trees according to claim 2 and characterized further in that said base means includes a fulcrum member mounted on said other arm portion at a spacing elevated from the path of cutting movement of said saw means to provide a pivot surface about which may fall the trunk portion of a tree cut by said saw means to direct the cut area of the trunk portion away from said saw means to prevent damage thereto as the tree falls.

6. Apparatus for felling trees according to claim 5 and characterized further by means mounted on said base means for exerting a pushing force in the direction of said fulcrum member on the trunk portion of a tree being cut by said saw means, said pushing means including a projection member for engaging an adjacent side of the tree to prevent its falling in the direction of the pivot mounting location of said saw means.

7. Apparatus for felling trees according to claim 1 and characterized further in that said base means includes toothed means for penetratingly engaging the trunk portion of a tree being cut by said saw means to retain said base means substantially stationary with respect to the trunk portion.

8. Apparatus for felling trees according to claim 1 and characterized further by means for pivotably mounting said saw means to said base means, said saw mounting means including a mounting member rigidly fixed to said base means, a saw drive member rigidly fixed to said saw means and bearing means supporting said saw drive member on said mounting member for rotational movement with respect thereto, and saw driving means rigidly fixed to said base means in driving relation to said saw drive member for actuating reciprocal rotation of said saw drive member to produce pivotal cutting movement of said saw means relative to said base means.

9. Apparatus for felling trees according to claim 8 and characterized further in that said saw drive member is supported by said bearing means annularly about the periphery of said mounting member in generally coplanar relation therewith, said saw driving means being in peripheral driving engagement with said saw drive member.

10. Apparatus for felling trees according to claim 9 and characterized further in that said saw drive member has a toothed periphery and said saw driving means had a compatibly toothed sprocket in meshing engagement with said saw drive member.

11. Apparatus for felling trees according to claim 9 and characterized further in that said saw means includes chain saw means having a saw bar and a saw chain mounted to said saw bar for movement along its peripheral extent, said saw drive member being fixed to said saw means at a first side of said saw bar, said mounting member and said saw bar having aligned openings coaxial with the pivot axis of said saw means, and chain drive means mounted stationarily to said mounting member at said first side of said saw bar and having a drive shaft extending concentrically through said aligned openings and a drive sprocket affixed to the extending end of said drive shaft in generally coplanar relation with said saw bar in driving engagement with said saw chain, said chain drive means and said saw means being unattached to said base means at the opposite side of said saw bar for mounting and demounting said saw chain in endless form to and from said saw bar from said opposite side of said saw bar without disassembly of said saw means or said mounting means.

12. Apparatus for felling trees according to claim 1 and characterized further in that said saw means includes chain saw means having a saw bar and a saw chain mounted to said saw bar for movement along its peripheral extent, and chain drive means mounted stationarily with respect to said base means and having a chain drive member coaxial with the pivot axis of said saw means and in generally coplanar relation with said saw bar in driving engagement with said saw chain.

13. Apparatus for felling trees according to claim 12 and characterized further in that said saw means and said chain drive means are unattached to said base means at one side of said saw bar for mounting and demounting said saw chain in endless form to and from said saw bar from said one side of said saw bar without disassembly of said saw means or said mounting means.

14. Apparatus for felling trees according to claim 13 and characterized further by means for pivotably mounting said saw means to said base means, said saw mounting means including a central mounting member rigidly fixed to said base means, an annular saw drive member rigidly fixed to said saw means and bearing means supporting said saw drive member annularly about the periphery of said mounting member in generally coplanar relation therewith for rotational movement with respect thereto, and driving means rigidly fixed to said base means in driving relation to said saw drive member for actuating reciprocal rotation of said saw drive member to produce pivotal cutting movement of said saw means relative to said base means.

15. Apparatus for felling trees according to claim 14 and characterized further in that said saw drive member is fixed to said saw means at a first side of said saw bar, said mounting member and said saw bar have aligned openings coaxial with the pivot axis of said saw means, said chain drive means is fixedly mounted to said mounting member at said first side of said saw bar and has a drive shaft extending concentrically through said aligned openings and a drive sprocket affixed to the extending end of said drive shaft in generally coplanar relation with said saw bar in driving engagement with said saw chain, said chain drive means and saw means being unattached to said base means at the opposite side of said saw bar for mounting and demounting said saw chain in endless form to and from said saw bar from said opposite side of said saw bar without disassembly of said saw means or said mounting means.

16. Apparatus for felling trees, comprising base means for disposition in generally stationary relation to a trunk portion of a tree to be felled, saw means for cutting the trunk portion, and means pivotably mounting said saw means to said base means for tree cutting movement with respect thereto, said saw mounting means including a mounting member rigidly fixed to said base means, a saw drive member rigidly fixed to said saw means, and bearing means supporting said saw drive member on said mounting member for rotational movement with respect thereto, and saw driving means rigidly fixed to said base means in driving relation to said saw drive member for actuating reciprocal rotation of said saw drive member to produce pivotal cutting movements of said saw means relative to said base means.

17. Apparatus for felling trees according to claim 16 and characterized further in that said saw drive member is supported by said bearing means annularly about the periphery of said mounting member in generally coplanar relation therewith, said saw driving means being in peripheral driving engagement with said saw drive member.

18. Apparatus for felling trees according to claim 17 and characterized further in that said saw drive member has a toothed periphery and said saw driving means had a compatibly toothed sprocket in meshing engagement with said saw drive member.

19. Apparatus for felling trees according to claim 17 and characterized further in that said saw means includes chain saw means having a saw bar and a saw chain mounted to said saw bar for movement along its peripheral extent, said saw drive member being fixed to said saw means at a first side of said saw bar, said mounting member and said saw bar having aligned openings coaxial with the pivot axis of said saw means, and chain drive means mounted stationarily to said mounting member at said first side of said saw bar and having a drive shaft extending concentrically through said aligned openings and a drive sprocket affixed to the extending end of said drive shaft in generally coplanar relation with said saw bar in driving engagement with said saw chain, said chain drive means and said saw means being unattached to said base means at the opposite side of said saw bar for mounting and demounting said saw chain in endless form to and from said saw bar from said opposite side of said saw bar without disassembly of said saw means or said mounting means.

20. Apparatus for felling trees, comprising base means for disposition in generally stationary relation to a trunk portion of a tree to be felled, chain saw means having a saw bar and a saw chain mounted to said saw bar for movement along its peripheral extent for cutting the trunk portion, means pivotably mounting said saw means to said base means for tree cutting movement with respect thereto, and chain drive means mounted stationarily with respect to said base means and having a chain drive member coaxial with the pivot axis of said saw means and in generally coplanar relation with said saw bar in driving engagement with said saw chain, said saw means and said chain drive means being unattached to said base means at one side of said saw bar for mounting and demounting said saw chain in endless form to and from said saw bar from said one side of said saw bar without disassembly of said saw means or said mounting means.

21. Apparatus for felling trees according to claim 20 and characterized further by means for pivotably mounting said saw means to said base means, said saw mounting means including a central mounting member rigidly fixed to said base means, an annular saw drive member rigidly fixed to said saw means and bearing means supporting said saw drive member annularly about the periphery of said mounting member in generally coplanar relation therewith for rotational movement with respect thereto, and driving means rigidly fixed to said base means in driving relation to said saw drive member for actuating reciprocal rotation of said saw drive member to produce pivotal cutting movement of said saw means relative to said base means.

22. Apparatus for felling trees according to claim 21 and characterized further in that said saw drive member is fixed to said saw means at a first side of said saw bar, said mounting member and said saw bar have aligned openings coaxial with the pivot axis of said saw means, said chain drive means is fixedly mounted to said mounting member at said first side of said saw bar and has a drive shaft extending concentrically through said aligned openings and a drive sprocket affixed to the extending end of said drive shaft in generally coplanar relation with said saw bar in driving engagement with said saw chain, said chain drive means and saw means being unattached to said base means at the opposite side of said saw bar for mounting and demounting said saw chain in endless form to and from said saw bar from said opposite side of said saw bar without disassembly of said saw means or said mounting means.

* * * * *

UNITED STATES PATENT AND TRADEMARK OFFICE
CERTIFICATE OF CORRECTION

PATENT NO.   :   4,763,705
DATED        :   August 16, 1988
INVENTOR(S)  :   Calvin S. Johnson It is certified that error appears in the above-identified patent and that said Letters Patent is hereby corrected as shown below:

Abstract, Line 10, Column 2, reads "sw" but should read -- saw --.

Column 2, Line 12, reads "U-shaped" but should read -- U-shape --.

Column 2, Line 22, after "substantially" delete -- a --.

Column 4, Line 62, reads "thereinafter" but should read -- hereinafter --.

Column 12, Line 12, reads "had" but should read -- has --.

Column 13, Line 38, reads "had" but should read -- has --.

Signed and Sealed this

First Day of September, 1992

Attest:

DOUGLAS B. COMER

Attesting Officer

Acting Commissioner of Patents and Trademarks